Patented Jan. 6, 1948

2,434,139

UNITED STATES PATENT OFFICE 2,434,139

BLUE GLASS

William H. Armistead, Corning, N. Y., assignor to Corning Glass Works, Corning, N. Y., a corporation of New York No Drawing. Application October 11, 1945, Serial No. 621,853

7 Claims. (Cl. 106—54)

This invention relates to borosilicate glasses colored with cobalt and containing chlorine for the purpose of modifying the color as shown in the Taylor Patent 1,572,625. The patent shows that the color due to cobalt in a borosilicate glass is normally an undesirable red purple and that the introduction of chlorine into the glass converts this to the more desirable blue. It is further shown that this effect is most pronounced with glasses having a very high boric oxide content. However, glasses high in boric oxide have low chemical durability, are relatively soluble in water and other reagents and are not suitable for some purposes.

The primary object of this invention is to improve the chemical durability of the prior glasses.

Another object is to provide a highly stable borosilicate glass in which the presence of cobalt will produce a blue color instead of red purple.

Another object is to increase the retention of chloride or increase the residual chlorine content of a borosilicate glass containing cobalt.

I have found that in such glasses the quality of the color, that is, the shift from red purple to blue, is largely dependent upon the amount of chloride which is retained in the glass, it being well known that chlorides are volatilized to such an extent during melting that only very small amounts are ordinarily retained regardless of the amount present in the batch. Ordinarily, the amount of chloride which is retained is equivalent to not more than about .3% of chlorine. I have found that the presence of 10% or more of alumina in the glass causes the retention of chloride equivalent to .5% or more of chlorine.

By thus increasing the chloride content of the glass I am able to decrease its boric oxide content while still retaining the desirable blue color, thus greatly improving the chemical durability of the glass and making it more useful for various purposes.

Briefly, my invention comprises a blue glass which consists essentially of silica, boric oxide, alkali metal oxide ($R_2O$), and alumina, the silica being from about 40% to 70%, the boric oxide being from about 10% to 25% and preferably less than 20%, the $R_2O$ being from about 5% to 22% and the alumina being over 10% and preferably over 15% and which also contains from .02% to about 2% of cobalt oxide and at least .5% of chlorine as determined by analysis. As the alumina content of the glass is increased, more of the chloride is retained and hence the quality of the color of the glass is improved. While the minimum effective amount of alumina is about 10%, the maximum amount is limited only by the increasing hardness and ultimate unmeltability of the glass. The addition of fluoride to the batch also seems to increase the retention of chloride in the glass but fluorine has no direct effect on the color. Since fluoride also has a softening effect upon the glass, its presence with the chloride is also advantageous for counteracting the hardening effect of alumina.

The chloride is introduced into the glass preferably as alkali metal chloride. On account of the large volatilization losses, the percentage of chloride which remains in the finished glass will be less than the amount which was introduced into the batch. It is, therefore, necessary to introduce an excess of chloride into the bath in order to obtain a substantial amount in the finished glass.

Glasses in which the alkali metal oxide is soda alone retain somewhat more chloride than potash glasses, but potash produces a slightly better color than soda. Lithia is detrimental, but can be employed in limited quantities.

The presence of iron impurities in the glass in amount not exceeding about .02% $Fe_2O_3$ has no ill effect upon the color due to cobalt but, if the amount of iron exceeds about .02% $Fe_2O_3$, the general transmission of the glass is decreased and this objectionable effect is greater as the amount of iron is increased. However, I have found that the undesirable effect of excessive iron is eliminated if the total alkali metal content, estimated as oxide, exceeds the amount of alumina, that is, if the ratio $R_2O/Al_2O_3$ is greater than 1.

Divalent oxides, such as the oxides of metals of the second periodic group, lead, etc., even in small amounts, have an objectionable inhibiting effect on the blue coloration due to cobalt. Consequently, the inhibiting oxides must be substantially absent from the glass.

Melting the glass in closed pots also facilitates the retention of chloride in the glass and hence is a further aid in producing the desired coloration with cobalt.

The following compositions in percent by weight show, by way of example, glasses made in accordance with my invention as compared with the prior glasses. The compositions were calculated from their respective batches into approximate weight percent on the oxide basis. The analytical chloride content of each glass is shown.

|  | I | II | III | IV | V | VI | VII |
|---|---|---|---|---|---|---|---|
| $SiO_2$ | 53 | 51 | 49 | 67.5 | 40 | 47 | 65 |
| $B_2O_3$ | 15 | 15 | 15 | 15.0 | 20 | 39 | 23 |
| $Al_2O_3$ | 16 | 18 | 20 | 10.0 | 20 | 3 | 5 |
| $K_2O$ | 13 | 13 | 13 | ----- | 8 | 11 | 7 |
| $Na_2O$ | 3 | 3 | 3 | 7.5 | 12 | ----- | ----- |
| $Co_2O_3$ | .3 | .3 | .3 | .3 | .3 | .3 | .3 |
| Per cent Cl by analysis | 0.53 | 0.64 | 0.74 | 0.59 | 0.62 | 0.26 | 0.19 |

The above glasses were melted in open crucibles. The batch for each glass contained approximately 4 parts KCl and .3 part $Co_2O_3$ per 100 parts of glass. Hence they are comparable in that each batch had the same chlorine and cobalt contents. In glasses I to IV inclusive 3% of the $Na_2O$ was introduced as $Na_2SiF_6$ so that these glasses contain fluorine, the presence of which may be shown by analysis.

Compositions I to V inclusive are examples of glasses made in accordance with this invention. It will be noted that their chlorine contents as determined by analysis exceed 0.5% Cl.

Compositions VI and VIII correspond to glasses 4 and 11, respectively, of the prior patent above referred to. It will be noted that the chlorine contents of glasses VI and VII as determined by analysis are less than .3% Cl, and that glass VII, which has the maximum alumina content shown in the prior patent, contains less than .2% Cl.

I claim:

1. A blue glass which consists essentially of $SiO_2$, $B_2O_3$, $R_2O$ (alkali metal oxide) and $Al_2O_3$, the $SiO_2$ being from about 40% to 70%, the $B_2O_3$ being from about 10% to 25%, the $R_2O$ being from about 5% to 22%, and the $Al_2O_3$ being over 10%, and which also contains not over about 2% of cobalt oxide and at least .5% of analytically determined chlorine.

2. A blue glass which consists essentially of $SiO_2$, $B_2O_3$, $R_2O$ (alkali metal oxide and $Al_2O_3$, the $SiO_2$ being from about 40% to 70%, the $B_2O_3$ being from about 10% to 25%, the $R_2O$ being from about 5% to 22%, and the $Al_2O_3$ being over 10%, and which also contains not over about 2% of cobalt oxide and at least .5% of analytically determined chlorine and shows by analysis the presence of fluorine.

3. A blue glass which consists essentially of $SiO_2$, $B_2O_3$, $R_2O$ (alkali metal oxide, and $Al_2O_3$, the $SiO_2$ being from about 40% to 70%, the $B_2O_3$ being from about 10% to 25%, the $R_2O$ being not over 22%, the $Al_2O_3$ being over 10%, the ratio $R_2O/Al_2O_3$ being not less than 1, and which also contains not over 2% of cobalt oxide and at least .5% of analytically determined chlorine.

4. A blue glass which consists essentially of $SiO_2$, $B_2O_3$, $R_2O$ (alkali metal oxide), and $Al_2O_3$, the $SiO_2$ being from about 40% to 70%, the $B_2O_3$ being from about 10% to 25%, the $R_2O$ being not over 22%, the $Al_2O_3$ being over 10%, the ratio $R_2O/Al_2O_3$ being not less than 1, and which also contains not over 2% of cobalt oxide and at least .5% of analytically determined chlorine, and shows by analysis the presence of fluorine.

5. A blue glass which has the approximate composition 51% $SiO_2$, 15% $B_2O_3$, 18% $Al_2O_3$, 13% $K_2O$, 3% $Na_2O$, .3% $Co_2O_3$, and at least .5% Cl.

6. A blue glass which consists essentially of $SiO_2$, $B_2O_3$, $R_2O$ (alkali metal oxide) and $Al_2O_3$, the $SiO_2$ being from about 40% to 70%, the $B_2O_3$ being from about 10% to 25%, the $R_2O$ being from about 7.5% to 22%, and the $Al_2O_3$ being over 10% and which also contains not over about 2% of cobalt oxide and at least .5% of analytically determined chlorine.

7. A blue glass which consists essentially of $SiO_2$, $B_2O_3$, $R_2$ (alkali metal oxide) and $Al_2O_3$, the $SiO_2$ being from about 40% to 70%, the $B_2O_3$ being from about 10% to 25%, the $R_2O$ being from about 7.5% to 22%, and the $Al_2O_3$ being over 10%, and which also contains not over about 2% of cobalt oxide and at least .5% of analytically determined chlorine, and shows by analysis the presence of fluorine.

WILLIAM H. ARMISTEAD.